May 22, 1956  J. B. CAMPBELL, JR  2,746,415
LIQUID LEVEL SIGNALLING DEVICE
Filed Dec. 31, 1954
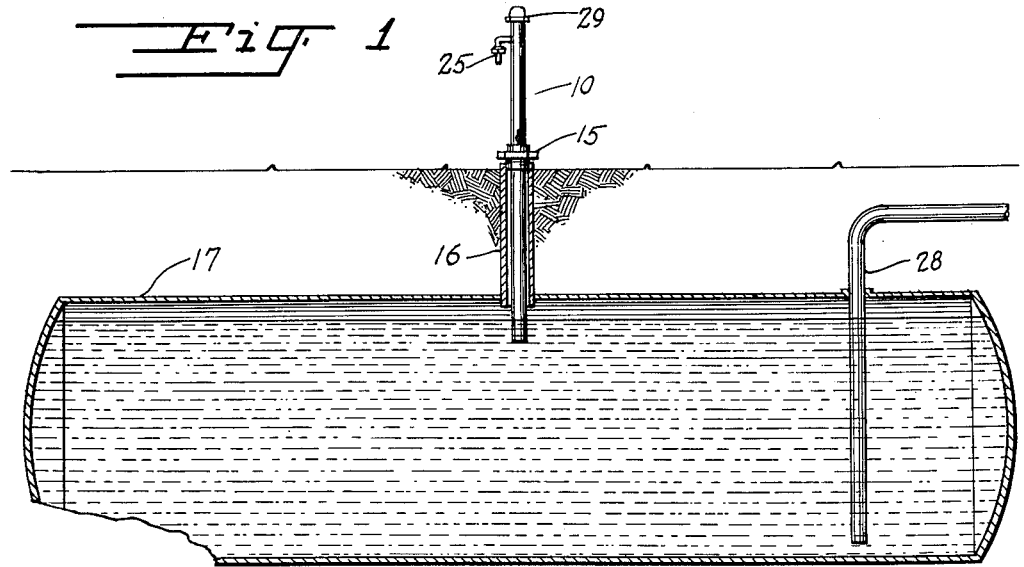
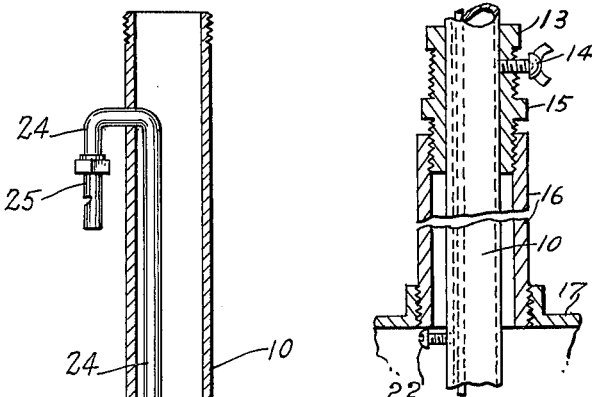
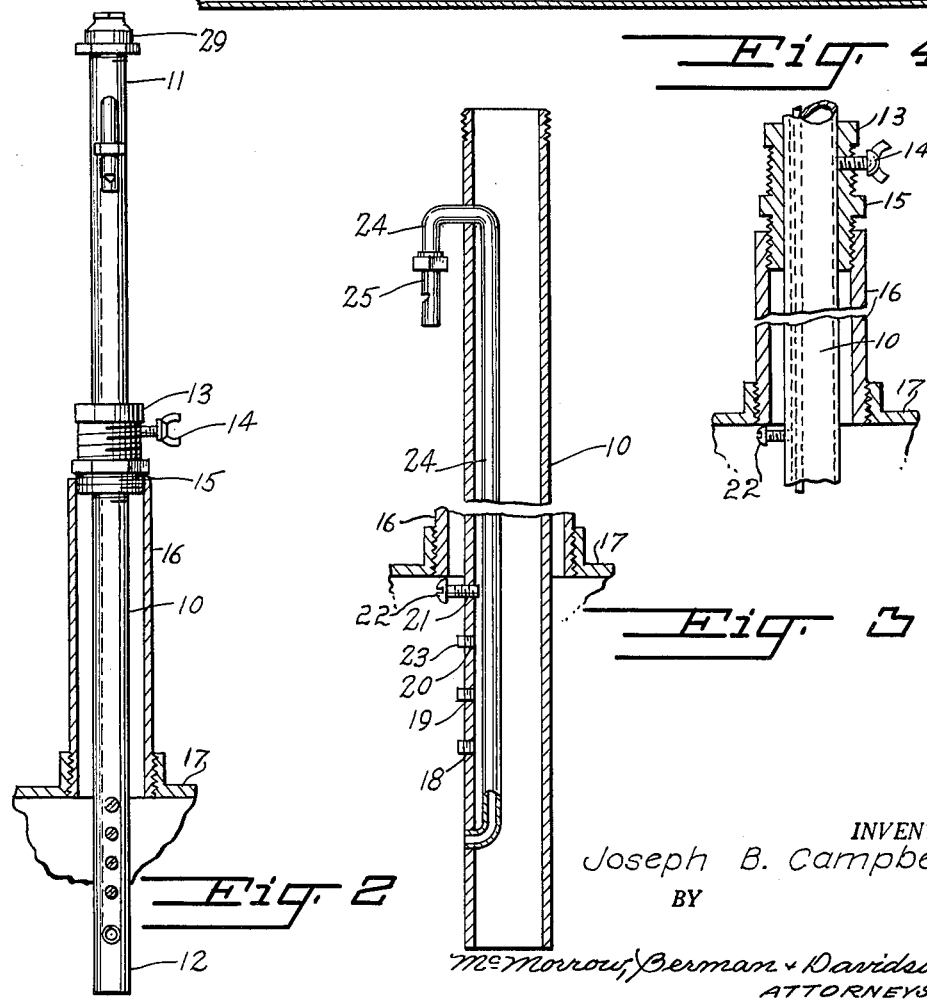
INVENTOR.
Joseph B. Campbell Jr.
BY
McMorrow, Berman & Davidson
ATTORNEYS

United States Patent Office 2,746,415
Patented May 22, 1956

2,746,415

LIQUID LEVEL SIGNALLING DEVICE

Joseph B. Campbell, Jr., Glen Cove, N. Y.

Application December 31, 1954, Serial No. 479,050

3 Claims. (Cl. 116—109)

The present invention relates to signalling devices for use with tanks containing liquids.

A primary object of the present invention is to provide a new and improved form of liquid level signalling device for indicating when the level of a liquid has reached a predetermined height within a tank or container.

Another object of the present invention is to provide a liquid level signalling device which may be attached to the delivery hose or tube of a fuel oil truck and may be inserted within the filler pipe of the fuel oil tank while the tank is being filled.

A further object of the present invention is to provide a liquid level signalling device which may be incorporated in the structure of the filler pipe of a fuel oil tank and attached to the fuel delivery hose or tube of the fuel oil truck when a delivery of fuel is made.

A still further object of the present invention is to provide a liquid level signalling device of simple and sturdy construction, one which is adjustable to permit filling a tank up to a predetermined level, and one which is automatic in operation requiring no replacement of parts or any attention for maintenance.

These and other objects and advantages of the present invention will be fully apparent from the following description when taken in connection with the annexed drawings, in which:

Figure 1 is a side view in cross-section of a tank having a filler pipe with the present invention installed within the filler pipe, Figure 2 is a side view in elevation of the present invention removed from a tank, and Figure 3 is a side view in cross-section of the present invention.

Figure 4 is a fragmentary enlarged view of the tube, filler pipe and bolt in association with the lower end of the filler pipe.

Referring in greater detail to the drawing, the invention consists of a tube 10 having upper and lower ends 11 and 12, respectively, and having positioned intermediate of its ends a sliding collar 13 having a thumbscrew 14 and a threaded bushing 15 at its lower end.

The threaded bushing 15 fits within the upper end of a filler pipe 16, having internal threads, the pipe being of conventional construction and extending upwardly from the upper end of a tank 17, as shown in Figure 1.

The lower end portion of the tube 10 is provided with a vertically arranged series of holes 18, 19, 20, and 21, in one of which is inserted a threaded stop means consisting of a bolt 22, the other holes being plugged by stud bolts 23. The bolt 22 may be used in any one of the holes 18 to 21, inclusive, it being understood that all of the holes would be filled with the bolt 22 and the stud bolts 23.

A copper tube 24 extends within the tube 10 from its lower end portion to its upper end portion and is connected in communication with the space above the liquid level within the tank 17 exteriorly of the tube 10 at a point intermediate the open lower end 12 of the tube 10 and the bolt 22. The upper end of the tube 24 extends exteriorly of the tube 10 and is provided with a whistle means 25 at its free end in communication with the atmosphere.

It is an important feature of the present invention that the dimensions of the tube 10 with the bolt 22 where it projects from the one side of the tube 10 in assembled condition be of less width than the opening within the filler pipe 16 to permit a loose fit of the tube 10 within the filler pipe and to permit tilting of the tube 10 within the filler pipe so that after the tube and its assembled bolt 22 have been inserted within the filler pipe it may be moved upwardly and downwardly and on the upward movement the bolt 22 will engage the lower end of the filler pipe 16 and will act as a stop means to indicate and to position the open lower end of the tube 24 at the predetermined height within the tank 17.

The tank 17 is provided with a supply pipe 28, not a part of the present invention, by means of which the tank is connected to whatever apparatus is used with the contents of the tank, such as a furnace, if the tank 17 is used for the storage of fuel oil for the furnace.

The invention may be used with other tanks containing other material than fuel oil and is applicable for many industrial uses in which the tanks are desirably filled to a predetermined level. In use, a nipple or other connection, as indicated by the reference numeral 29 in Figures 1 and 2 may be used to connect the tube 10 to a source of liquid and the tube 10 may be incorporated in the delivery tube or may be assembled within the filler pipe 16, as desired.

The collar 13 is slidable upon the tube 10 to adjustably position and to lock the tube 10 in its upward position when the stop means or the bolt 22 has engaged the lower end of the filler pipe 16.

As the tank is being filled, the liquid will flow through the tube 10 and entrap air in the upper end of the tank to force the air through the tube 24 and the whistle means 25, indicating that the fluid level has not yet reached the lower end of the tube 24. Upon reaching the lower end of the tube 24, the cessation of sound from the whistle means 25 will indicate that the fluid level in the tank has reached the lower end of the tube 24.

The use of the present invention will prevent flooding of the tank or overflowing of the tank and will permit the repeated filling of the tank to a predetermined level.

While only a preferred embodiment of the present invention has been shown and described, other embodiments may be made and practiced within the scope of the appended claims without departing from the spirit of the invention.

What is claimed is:

1. For use with a closed container having a filler pipe extending upwardly from an upper end of the container, a liquid level signalling device for insertion in the filler pipe, said device comprising a tube having open upper and lower ends adapted to be loosely inserted in said filler pipe with its lower end portion projecting into the container and with its upper end projecting out of said filler pipe and adapted to be connected to a source of fluid, means closing said filler pipe around said tube, said tube being adjustably movable upwardly and downwardly in said filler pipe, stop means carried on said lower end portion of said tube engageable with the lower end of said filler pipe for indicating when said tube has been moved upwardly to a predetermined height within said container, a by-pass disposed in said tube and having its lower end communicating exteriorly thereof intermediate the lower end of said tube and said stop means, said by-pass providing a passage for air entrapped over the liquid in said container while said container is being filled through said tube, and a whistle means carried on the upper end of said by-pass exteriorly of said tube operable by the air escaping through said by-pass while said container is being filled to the level of the lower end of said by-pass.

2. For use with a closed container having a filler pipe extending upwardly from an upper end of the container, a liquid level signalling device for insertion in the filler pipe, said device comprising a tube having open upper and lower ends adapted to be loosely inserted in said filler pipe with its lower portion projecting into the container and with its upper end portion projecting out of said filler pipe and adapted to be connected to a source of fluid, means closing said filler pipe around said tube, said tube being adjustably movable upwardly and downwardly in said filler pipe, adjustable stop means carried on said lower end portion of said tube engageable with the lower end of said filler pipe for indicating when said tube has been moved upwardly to a predetermined height within said container, lock means carried on said tube engageable with said filler pipe for releasably holding said tube in its adjusted position, a by-pass disposed in said tube and having its lower end communicating exteriorly thereof intermediate the lower end of said tube in said stop means, said by-pass providing a passage for air entrapped over the liquid in said container while said container is being filled through said tube, and whistle means carried on the upper end of said by-pass exteriorly of said tube operable by the air escaping through said by-pass while said container is being filled to the level of the lower end of said by-pass.

3. For use with a closed container having a filler pipe extending upwardly from an upper end of the container, a liquid level signalling device for insertion in the filler pipe, said device comprising a tube having open upper and lower ends adapted to be loosely inserted in said filler pipe with its lower end portion projecting into the container with its upper end projecting out of said filler pipe and adapted to be connected to a source of fluid, means closing said filler pipe around said tube, said tube being adjustably movable upwardly and downwardly in said filler pipe, adjustable stop means projecting outwardly from said lower end portion of said tube on one side thereof, the lower end of said tube and said projecting stop means being dimensioned relative to said filler pipe to permit the insertion of the lower end portion of said tube and said stop means in assembled condition through said filler pipe into said container, said stop means being operable to engage the lower end of said filler pipe when said tube is moved upwardly within said filler pipe with the side of said tube having stop means in abutting relation with respect to the inner wall of said filler pipe, lock means carried on said tube engageable with said filler pipe for releasably holding said tube in its adjusted position, a by-pass disposed in said tube and having its lower end communicating exteriorly thereof and intermediate the lower end of said tube in said stop means, said by-pass providing a passage for air entrapped over the liquid in said container while said container is being filled through said tube, and whistle means carried on the upper end of said by-pass exteriorly of said tube operable by the air escaping through said by-pass while said container is being filled to the level of the lower end of said by-pass.

References Cited in the file of this patent

UNITED STATES PATENTS

| | | |
|---|---|---|
| 753,600 | Maul | Mar. 1, 1904 |
| 1,116,934 | Seltzer et al. | Nov. 10, 1914 |